United States Patent [19]

Ikeda et al.

[11] 4,266,003
[45] May 5, 1981

[54] SILVER HALIDE PHOTOGRAPHIC EMULSIONS

[75] Inventors: Tadashi Ikeda; Takeo Sakai; Haruo Takei; Noriyuki Inoue, all of Minami-ashigara, Japan

[73] Assignee: Fuji Photo Film Co., Ltd., Minami-ashigara, Japan

[21] Appl. No.: 78,756

[22] Filed: Sep. 25, 1979

[30] Foreign Application Priority Data

Sep. 25, 1978 [JP] Japan .................................. 53/117668

[51] Int. Cl.³ .............................................. G03C 1/10
[52] U.S. Cl. ...................................... 430/264; 430/266; 430/267; 430/268; 430/578; 430/592; 430/593; 430/637; 430/949
[58] Field of Search ............... 430/268, 578, 592, 593, 430/264, 267, 949, 637, 266

[56] References Cited

U.S. PATENT DOCUMENTS

| 2,839,403 | 6/1958 | Knott | 430/578 |
| 3,765,900 | 10/1973 | Depoorter et al. | 430/592 |
| 3,765,901 | 10/1973 | Schellekens et al. | 430/592 |
| 4,014,702 | 3/1977 | Hinata et al. | 430/592 |
| 4,154,616 | 5/1979 | Sato et al. | 430/593 |
| 4,172,728 | 10/1979 | Sincius et al. | 430/268 |

Primary Examiner—J. Travis Brown
Attorney, Agent, or Firm—Sughrue, Rothwell, Mion, Zinn and Macpeak

[57] ABSTRACT

A silver halide photographic emulsion which comprises at least one compound represented by the formula (I):

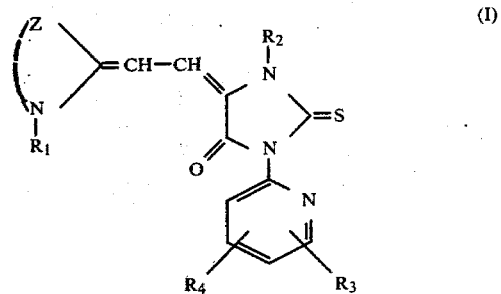

where Z represents an atomic group necessary to complete an oxazole nucleus, a benzoxazole nucleus or a naphthoxazole nucleus, $R_1$ represents a substituted or unsubstituted alkyl group, $R_2$ represents an alkoxycarbonylalkyl group, a hydroxyalkyl group, a hydroxyalkoxyalkyl group, a carbamoylalkyl group, a hydroxyphenyl group or a hydroxyalkylphenyl group, and $R_3$ and $R_4$ which may be the same or different each represents a hydrogen atom, an alkyl group, an alkoxy group, a chlorine atom or a carboxyl group, and a lithographic silver halide material containing the same.

22 Claims, No Drawings

SILVER HALIDE PHOTOGRAPHIC EMULSIONS

BACKGROUND OF THE INVENTION

1. Field of the Invention

The present invention relates to silver halide emulsions spectrally sensitized by novel merocyanine dyes and particularly to silver halide photographic emulsions having high green sensitivity.

2. Description of the Prior Art

Hitherto, as spectral sensitizers for photographic emulsions, it has been known to use certain dimethine merocyanine dyes as described in, for example, U.S. Pat. Nos. 3,480,439, 3,501,306, 3,567,458, 3,625,698, 3,698,910, 3,736,145, 3,765,900, 3,765,901, and 4,057,430, Japanese Patent Publication Nos. 18105/71 and 549/71, German Pat. No. 1,234,522 and British Pat. No. 800,244, etc. However, silver halide photographic sensitive materials containing these known dimethine merocyanine dyes often suffer stains, deterioration of sensitivity with a lapse of time or increase fogging.

SUMMARY OF THE INVENTION

Accordingly, a first object of the present invention is to provide silver halide photographic emulsions containing merocyanine dyes which have a high spectral sensitization function.

A second object of this invention is to provide spectrally sensitized silver halide photographic emulsions which suffer less deterioration of sensitivity and less fogging in the prepared sensitive materials over time.

A third object of this invention is to provide litho type silver halide emulsions containing novel merocyanine dyes.

A fourth object of this invention is to provide sensitizing dyes which do not stain after development processing and have excellent solubility.

DETAILED DESCRIPTION OF THE INVENTION

The above described objects have been attained by incorporating compounds represented by the following formula (I) in silver halide photographic emulsions.

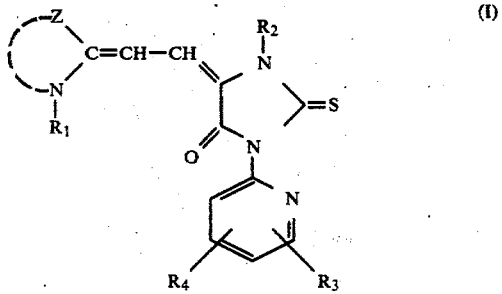

In the formula, Z represents an atomic group necessary to complete an oxazole nucleus, a benzoxazole nucleus or a naphthoxazole nucleus, which may bear substituents on the carbon atoms. Examples of the substituents include halogen atoms (for example, a fluorine atom, a chlorine atom or a bromine atom), unsubstituted alkyl groups having 1 to 6 carbon atoms, which may be a straight or branched chain (for example, a methyl group, an ethyl group, a propyl group, a butyl group, and a hexyl group), alkoxy groups having 1 to 4 carbon atoms, which may be a straight or branched chain (for example, a methoxy group, an ethoxy group, a propoxy group and a butoxy group), a hydroxyl group, alkoxycarbonyl groups having 2 to 6 carbon atoms, which may be a straight or branched chain (for example, a methoxycarbonyl group and an ethoxycarbonyl group, etc.), alkylcarbonyl groups having 2 to 5 carbon atoms, which may be a straight or branched chain (for example, an acetyloxy group and a propionyloxy group, etc.), a phenyl group and a hydroxyphenyl group, etc.

Examples of the nuclei include oxazole, 4-methyloxazole, 5-methyloxazole, 4,5-dimethyloxazole and 4-phenyloxazole, etc., as the oxazole nucleus, benzoxazole, 5-chlorobenzoxazole, 5-bromobenzoxazole, 5-methylbenzoxazole, 5-ethylbenzoxazole, 5-methoxybenzoxazole, 5-hydroxybenzoxazole, 5-ethoxycarbonylbenzoxazole, 5-acetyloxybenzoxazole, 5-phenylbenzoxazole, 6-methylbenzoxazole, 6-methoxybenzoxazole, 5,6-dimethylbenzoxazole and 6-chloro-5-methylbenzoxazole, etc., as the benzoxazole nucleus, and naphtho[1,2-d]oxazole, naphtho[2,1-d]oxazole and naphtho[2,3-d]oxazole, etc., as the naphthoxazole nucleus.

$R_1$ represents an unsubstituted or substituted alkyl group having a total of 1 to 10 carbon atoms (hereinafter, the carbon atom number means the total number including substituents). Examples of the substituents include a hydroxyl group, a sulfo group, a sulfato group, a carboxyl group, halogen atoms (for example, a fluorine atom and a chlorine atom), unsubstituted or substituted alkoxy groups having 1 to 4 carbon atoms, which may be a straight or branched chain (which may be substituted by a sulfo group or a hydroxyl group), alkoxycarbonyl groups having 2 to 5 carbon atoms, alkylsulfonyl groups having 1 to 4 carbon atoms, sulfamoyl groups, unsubstituted or substituted carbamoyl groups (including N-alkylcarbamoyl groups in which the alkyl moiety contains 1 to 4 carbon atoms), substituted phenyl groups (examples of the substituents include a sulfo group, a carboxyl group and a hydroxyl group, etc.), and a vinyl group, etc. $R_1$ is preferably a carboxyalkyl group, a hydroxyalkyl group, a sulfoaralkyl group, a sulfamoylalkyl group or a sulfoalkyl group, and is most preferably a sulfoalkyl group.

Examples of the unsubstituted alkyl groups include a methyl group, an ethyl group, a propyl group and a butyl group, etc. Examples of the substituted alkyl groups include a 2-hydroxyethyl group and a 3-hydroxypropyl group, etc., as hydroxyalkyl groups; a 2-sulfoethyl group, a 3-sulfopropyl group, a 3-sulfobutyl group, a 4-sulfobutyl group, a 2-hydroxy-3-sulfopropyl group and a 2-chloro-3-sulfopropyl group, etc., as sulfoalkyl groups; a 2-sulfatoethyl group, a 3-sulfatopropyl group, etc., as sulfatoalkyl groups; a carboxymethyl group, a carboxyethyl group and a carboxypropyl group, etc., as carboxyalkyl groups; a 2,2,2-trifluoroethyl group, a 2-(3-sulfopropyloxy)ethyl group, a 2-(2-hydroxyethoxy)ethyl group, an ethoxycarbonylethyl group, a methylsulfonylethyl group, a 2-sulfamoylethyl group as sulfamoylalkyl groups; a 2-carbamoylethyl group, a 2-N,N-dimethylcarbamoylethyl group, a phenethyl group, a p-carboxyphenethyl group, a p-sulfophenethyl group and an o-sulfophenethyl group as sulfoaralkyl groups; a p-hydroxyphenethyl group, an allyl group and a phenoxyethyl group, etc.

$R_2$ represents an alkoxycarbonylalkyl group having 3 to 7 carbon atoms (for example, a methoxycarbonylmethyl group, an ethoxycarbonylmethyl group or an ethoxycarbonylethyl group, etc.), a hydroxyalkyl group having 1 to 4 carbon atoms (for example, a 2-hydroxyethyl group, a 2-hydroxypropyl group, a 3-hydroxypropyl group or a 2,3-dihydroxypropyl group, etc.), a hydroxyalkoxyalkyl group having 2 to 6 carbon atoms (for example, a hydroxymethoxymethyl group, a 2-(2-hydroxyethoxy)ethyl group or a 2-hydroxyethoxymethyl group, etc.), a carbamoylalkyl group having 2 to 8 carbon atoms (including N-alkyl-substituted, N,N-dialkyl-substituted, N-hydroxyalkyl-substituted, N-alkyl-N-hydroxyalkyl-substituted and N,N-di(hydroxyalkyl)-substituted carbamoylalkyl groups and carbamoylalkyl groups of 5- or 6-membered cyclic amines) (for example, a 2-carbamoylethyl group, a 2-N-(2-hydroxyethyl)carbamoylethyl group, an N-dihydroxyethylcarbamoylmethyl group, an N,N-di(2-hydroxyethyl)carbamoylmethyl group, a 2-N,N-di(2-hydroxyethyl)carbamoylethyl group, an N,N-dimethylcarbamoylmethyl group, a morpholinocarbamoylmethyl group or a piperidinocarbamoylmethyl group, etc.), a hydroxyphenyl group or a hydroxyalkylphenyl group having 7 to 9 carbon atoms (for example, a p-(2-hydroxyethyl)phenyl group or an m-(1-hydroxyethyl)phenyl group, etc.). $R_2$ is preferably a hydroxyalkoxyalkyl group or a hydroxyalkyl group.

$R_3$ and $R_4$ may be the same or different and each represents a hydrogen atom, an alkyl group having 1 to 4 carbon atoms (for example, a methyl group or an ethyl group, etc.), an alkoxy group having 1 to 4 carbon atoms (for example, a methoxy group or an ethoxy group, etc.), a chlorine atom or a carboxyl group.

In dyes represented by the above described formula (I), particularly preferred are those in which Z represents an atomic group necessary to complete a benzoxazole nucleus and $R_1$ represents a sulfoalkyl group, a carboxyalkyl group, a hydroxyalkyl group, a sulfamoylalkyl group or a sulfoaralkyl group, the alkylene moieties of each of which have 1 to 5 carbon atoms. Those in which Z is an oxazole nucleus substituted at a carbon atom with a chlorine atom are also preferred.

In dyes represented by the above described formula (I), also preferred are those represented by the formula (II).

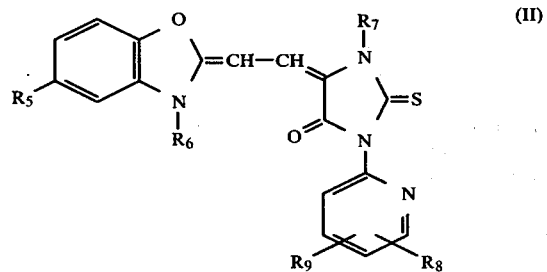

In the formula, $R_5$ represents a hydrogen atom, a chlorine atom, a hydroxyl group, an alkylcarbonyloxy group having up to 3 carbon atoms (for example, an acetyloxy group or a propionyloxy group, etc.), an unsubstituted alkyl group having up to 4 carbon atoms (for example, a methyl group, an ethyl group, a propyl group or a butyl group), or an unsubstituted alkoxy group having up to 4 carbon atoms (for example, a methoxy group, an ethoxy group or a propoxy group, etc.). $R_5$ is preferably a hydrogen atom or a chlorine atom.

$R_6$ represents a sulfoalkyl group having 2 to 4 carbon atoms (for example, a 2-sulfoethyl group, a 3-sulfopropyl group, a 3-sulfobutyl group, a 4-sulfobutyl group, a 2-chloro-3-sulfopropyl group or a 2-hydroxy-3-sulfopropyl group, etc.) or a sulfamoylalkyl group having up to 3 carbon atoms (for example, a 2-sulfamoylethyl group or a 3-sulfamoylpropyl group). $R_6$ is preferably a sulfoalkyl group.

$R_7$ represents a hydroxyalkoxyalkyl group having 2 to 6 carbon atoms (for example, a 2-(2-hydroxyethoxy)ethyl group, a 2-hydroxyethoxymethyl group or a hydroxymethoxymethyl group, etc.), a hydroxyalkyl group having 2 to 4 carbon atoms (for example, a 2,3-dihydroxypropyl group, a 2,3-dihydroxybutyl group, a 2-hydroxypropyl group or a 2-hydroxyethyl group, etc.), an N-substituted or N-unsubstituted carbamoylalkyl group having 3 to 6 carbon atoms excluding substituents (examples of the substituents of which include hydroxyalkyl groups such as a hydroxyethyl group, lower alkyl groups having 1 to 4 carbon atoms such as a methyl group, an ethyl group and an n-butyl group) (for example, a 2-carbamoylethyl group, a 2-(N-2-hydroxyethylcarbamoyl)ethyl group, a 2-[N,N-di(2-hydroxyethyl)carbamoyl]ethyl group, an N-2-hydroxyethylcarbamoylmethyl group, and an N,N-di(2-hydroxyethyl)carbamoylmethyl group, etc.), a hydroxyphenyl group (for example, a p-hydroxyphenyl group or an m-hydroxyphenyl group, etc.) or a hydroxyalkylphenyl group having a hydroxyalkyl group of up to 3 carbon atoms (for example, a p-2-hydroxyethylphenyl group or an m-1-hydroxyethylphenyl group, etc.).

$R_8$ represents a hydrogen atom, a chlorine atom, a methyl group, an ethyl group, a methoxy group or an ethoxy group.

$R_9$ represents a hydrogen atom, a methyl group or a methoxy group.

Typical examples of the compounds represented by the above described formula (I) used in the present invention are exemplified below but the compounds used in the present invention are not limited to these.

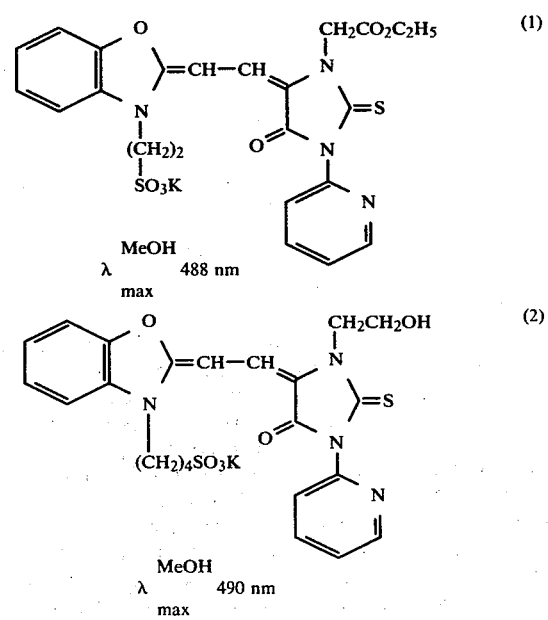

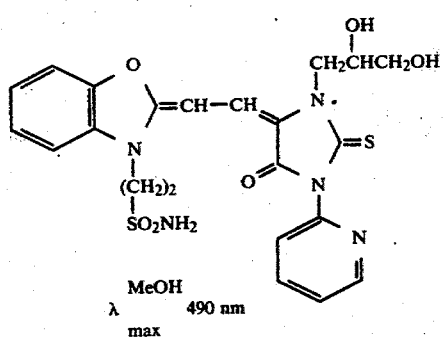
(3)
$\lambda_{max}^{MeOH}$ 490 nm
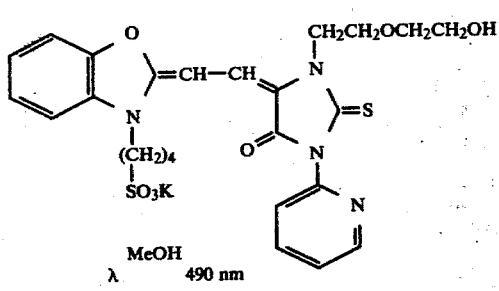
(4)
$\lambda_{max}^{MeOH}$ 490 nm
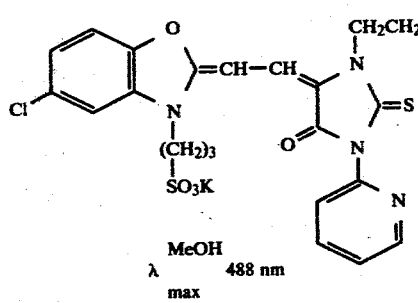
(5)
$\lambda_{max}^{MeOH}$ 488 nm
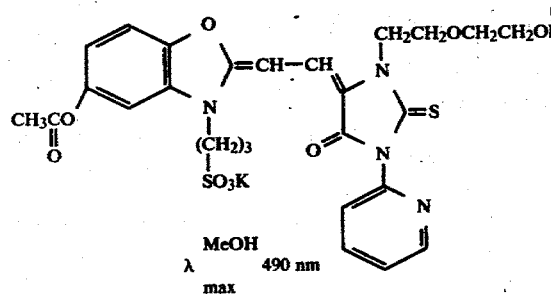
(6)
$\lambda_{max}^{MeOH}$ 490 nm
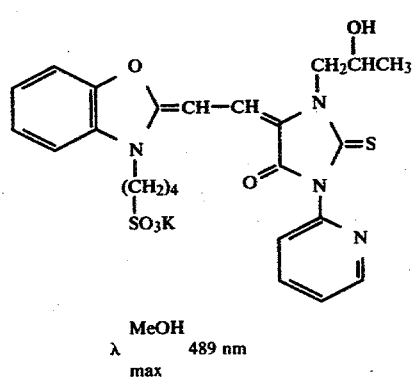
(7)
$\lambda_{max}^{MeOH}$ 489 nm
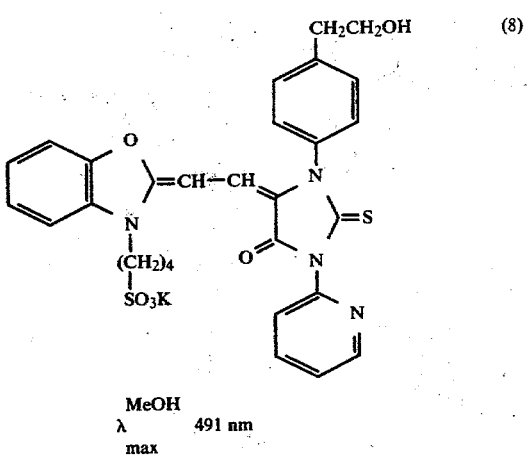
(8)
$\lambda_{max}^{MeOH}$ 491 nm
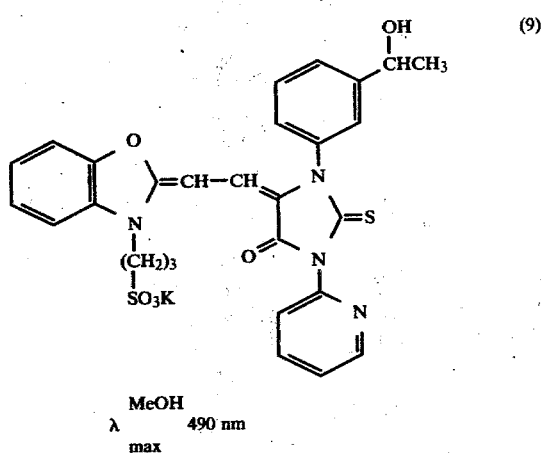
(9)
$\lambda_{max}^{MeOH}$ 490 nm
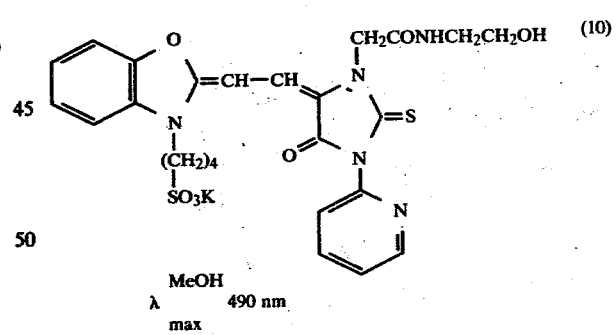
(10)
$\lambda_{max}^{MeOH}$ 490 nm
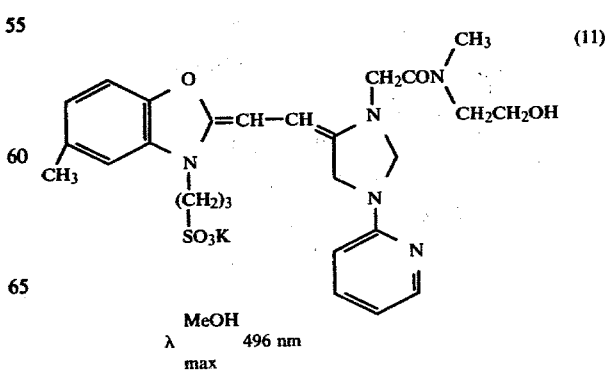
(11)
$\lambda_{max}^{MeOH}$ 496 nm -continued

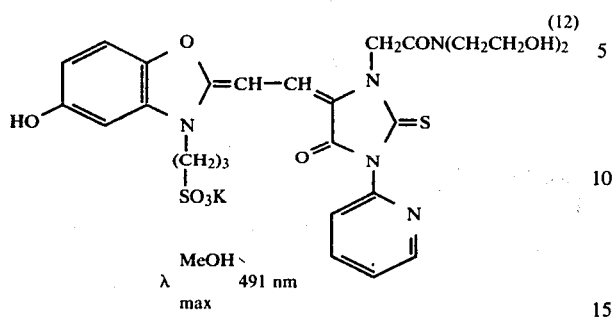

(12)

$\lambda_{max}^{MeOH}$ 491 nm

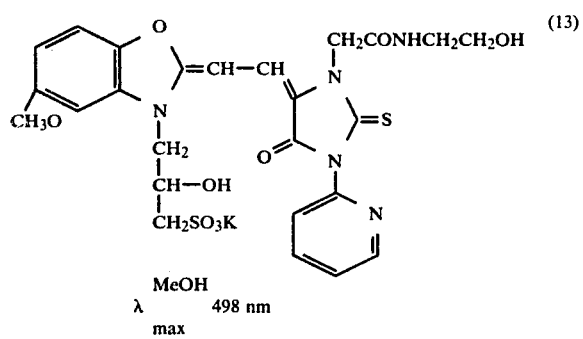

(13)

$\lambda_{max}^{MeOH}$ 498 nm

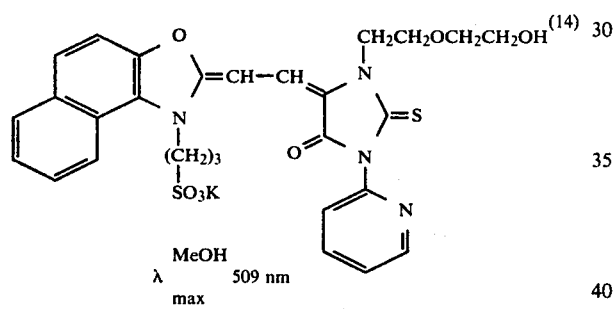

(14)

$\lambda_{max}^{MeOH}$ 509 nm

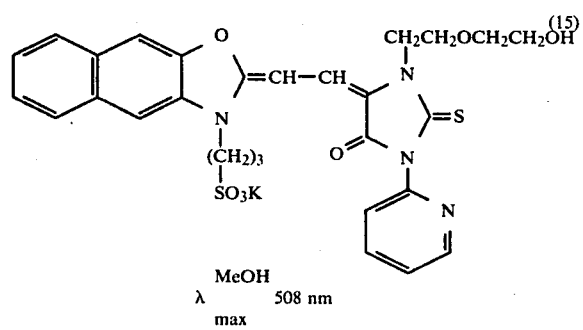

(15)

$\lambda_{max}^{MeOH}$ 508 nm

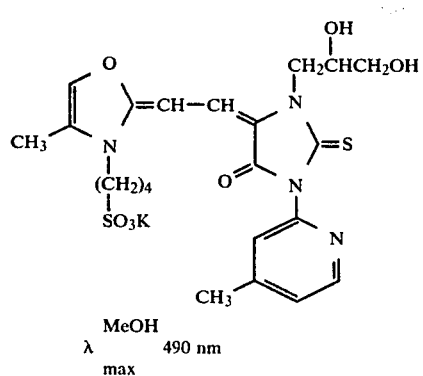

(16)

$\lambda_{max}^{MeOH}$ 490 nm

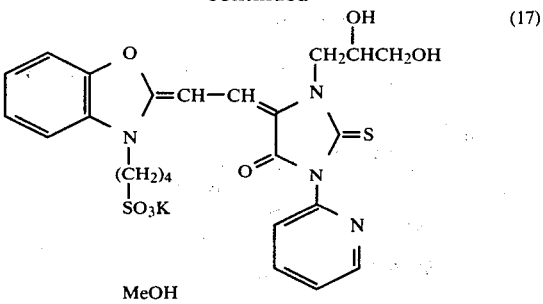

(17)

$\lambda_{max}^{MeOH}$ 491 nm

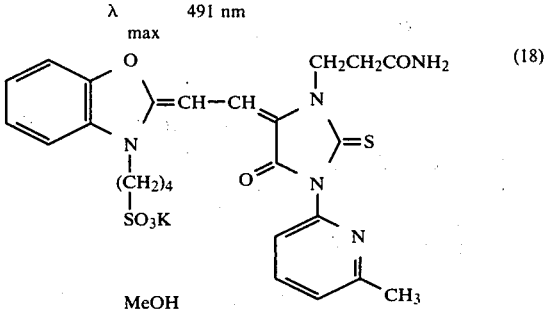

(18)

$\lambda_{max}^{MeOH}$ 488 nm

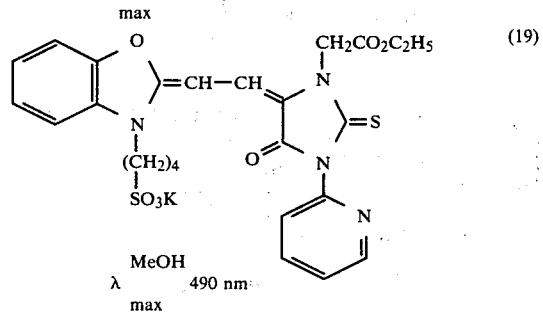

(19)

$\lambda_{max}^{MeOH}$ 490 nm

The novel merocyanine compounds of the present invention can be combined with other dyes disclosed in the following patents to carry out supersensitization (remarkable additional increase of sensitivity) of emulsions. For example, U.S. Pat. Nos. 3,617,294, 3,667,960, 3,745,014, 3,628,964, 3,615,635, 2,527,641, 3,522,052, 3,617,293, 3,703,377 and 2,519,001, U.S. Patent Application (CIP) Ser. No. 354,421, Japanese Patent Publication No. 24888/72 and Belgian Pat. No. 691,807. Particularly, in case of adding sensitivity to red light, thiacarbocyanine dyes are preferred. In case of increasing sensitivity to violet or blue light, monomethine thiacyanine dyes and apomerocyanine dyes having a 5-(1,4-dihydro-4-pyridylidene)rhodanine nucleus are preferred.

The compounds used in the present invention can be easily synthesized by persons skilled in the art with reference to processes for synthesizing dimethine merocyanines described in Japanese Patent Publication Nos. 18105/71 and 549/71, U.S. Pat. Nos. 3,625,698, 3,501,306, 3,736,145, 3,698,910, 4,057,430, 3,480,439 and 3,567,458, German Pat. No. 1,234,522 and British Pat. No. 800,244. In the following, synthesis examples, the synthesis of compounds used in the present invention are shown, and other compounds represented by the formula (I) can be synthesized by analogy to these examples.

SYNTHESIS EXAMPLE 1

Synthesis of Compound (19)

18.9 g of diethyliminodiacetate and 18.4 g of methyl-2-pyridyldithiocarbamate were put in a flask and heated to 100° C. for 5 hours. The product was subjected to silica gel column chromatography and fractions were extracted by a solvent mixture composed of n-hexane-ethyl acetate (1:1), were gathered to obtain 18.5 g of 1-ethoxycarbonylmethyl-3-(2-pyridyl)-2-thiohydantoin as a viscous oil. 5.6 g of this 2-thiohydantoin compound, 6.8 g of 4-[2-(2-anilonovinyl)-3-benzoxazolio]butanesulfonate and 100 ml of ethanol were put in a flask. After adding 4 ml of acetic anhydride and 6 ml of triethylamine, the mixture was heated under refluxing for 30 minutes. After condensing to remove the solvent, 200 ml of ethyl acetate was added thereto. After stirring for 30 minutes, the supernatant liquid was removed by decantation. 10 ml of methanol was added to dissolve the residue, and a solution prepared by dissolving 2.4 g of potassium acetate in 10 ml of methanol was added. After heating for 10 minutes, it was allowed to stand. Separated crystals were filtered and recrystallized with methanol to obtain 6.2 g of Compound (19) as orange crystals having a melting point of 202° C.

SYNTHESIS EXAMPLE 2

Synthesis of Compound (4)

19.5 g of methyl N-2-(2-hydroxyethoxy)ethyl acetate, 18.4 g of methyl 2-pyridyldithiocarbamate and 20 ml of toluene were put in a flask, and the mixture was heated to 100° C. for 3 hours. Volatile materials were then distilled off with heating to 70° C. using an aspirator. To the resulting 1-[2-(2-hydroxyethoxy)ethyl]-3-(2-pyridyl)-2-thiohydantoin (which had a boiling point of 200° C. at 0.6 mmHg), 34 g of 4-[2-(2-anilinovinyl)-3-benzoxazolio]butanesulfonate and 30 ml of morpholine were added. After heating to 90° C. for 30 minutes, 200 ml of ethyl acetate were added thereto, and the mixture was allowed to stand at room temperature. After the supernatant liquid was removed by decantation, a small amount of methanol was added to dissolve the residue. 50 ml of acetone was added with heating and the mixture was allowed to stand, upon which the whole of the mixture was crystallized. The crystals were separated by filtration and dissolved in 20 ml of methanol. After a solution prepared by dissolving 16 g of potassium acetate in 50 ml of methanol was added thereto and heated for 10 minutes, it was allowed to stand and the precipitated crystals were separated by filtration. They were recrystallized with methanol to obtain 32.6 g of reddish violet Compound (4) having a melting point of 245° C.

SYNTHESIS EXAMPLE 3

Synthesis of Compound (10)

4 g of the Compound (19) from Synthesis Example 1 and 10 ml of 2-aminoethanol were put in a flask. After heating to 150° C. for 2 hours, 100 ml of ethyl acetate was added thereto. The supernatant liquid was removed by decantation and a small amount of ethanol was added to the residue to crystallize it. The crystals were separated by filtration and recrystallized from methanol by adding 2 g of potassium acetate. These crystals were further recrystallized from methanol to obtain reddish violet Compound (10) having a melting point of 289° C.

The merocyanine dyes of the present invention are particularly suitable for increasing the green-sensitivity of lithographic type silver halide emulsions and for improving lithographic development.

In lithographic silver halide emulsions used in the present invention, it is possible to incorporate polyalkylene oxide compounds as a dot quality improving agent. The polyalkylene oxide compounds used in the present invention are defined as compounds having at least a polyalkylene oxide unit in their structure which improves the infectious development effect when used for silver halide photographic sensitive materials. They are, for example, compounds described in U.S. Pat. Nos. 2,400,532, 3,294,537, 3,294,540 and 3,345,175, French Pat. Nos. 1,491,805 and 1,596,673, and Japanese Patent Application (OPI) Nos. 156423/75 (The term "OPI" as used herein refers to a "published unexamined Japanese patent application"), 108130/77 and 3217/78. Preferred examples of the compounds include condensates of polyalkylene oxide composed of at least 10 alkylene oxide units having 2 to 4 carbon atoms such as ethylene oxide, propylene-1,2-oxide or butylene-1,2-oxide, etc., and preferably ethylene oxide; and a compound having at least one active hydrogen atom such as water, aliphatic alcohols having up to 30 carbon atoms, mono- or bicyclic aromatic alcohols, aliphatic acids having 4 to 30 carbon atoms, organic amines or hexitol derivatives, etc.; and blocked copolymers of two or more polyalkylene oxides. Namely, as examples of the polyalkylene oxide compounds, it is possible to use polyalkylene glycols, polyalkylene glycol alkyl ethers, polyalkylene glycol aryl ethers, polyalkylene glycol alkylaryl ethers, polyalkylene glycol esters, polyalkylene glycol aliphatic acid amides, polyalkylene glycol amines, polyalkylene glycol block copolymers and polyalkylene glycol graft polymers.

The polyalkylene oxides may contain not only one kind of alkylene oxide but also two kinds of alkylene oxide. In the latter case, each polyalkylene oxide chain may be composed of less than 10 alkylene oxide units, but the total number of alkylene oxide units in the molecule should be at least 10. In case of having two or more polyalkylene oxide chains in the molecule, each of them may have a different alkylene oxide unit such as ethylene oxide, propylene oxide, butylene oxide or styrene oxide. The polyalkylene oxide compounds used in the present invention preferably contain 14 to 100 alkylene oxide units.

The polyalkylene oxide compounds used in the present invention have a molecular weight of about 300 to 15,000 and preferably about 600 to 8,000 in number average.

Examples of the polyalkylene oxide compounds used in the present invention are as follows:

| | |
|---|---|
| $HO(CH_2CH_2O)_{10}H$ | 1. |
| $HO(CH_2CH_2O)_{90}H$ | 2. |
| $C_4H_9O(CH_2CH_2O)_{15}H$ | 3. |
| $C_{12}H_{25}O(CH_2CH_2O)_{15}H$ | 4. |
| $C_{18}H_{37}O(CH_2CH_2O)_{15}H$ | 5. |
| $C_{18}H_{37}O(CH_2CH_2O)_{40}H$ | 6. |
| $C_8H_{17}CH=CHC_8H_{16}O(CH_2CH_2O)_{15}H$ | 7. |

8.

$C_9H_{19}$—⟨ ⟩—$O(CH_2CH_2O)_{30}H$

9.

$CH_3$—⟨ ⟩—$O(CH_2CH_2O)_{30}H$

10.

⟨ ⟩—$O$—$(CH_2CH_2O)_{20}H$

| | |
|---|---|
| $C_{11}H_{23}COO(CH_2CH_2O)_{80}H$ | 11. |

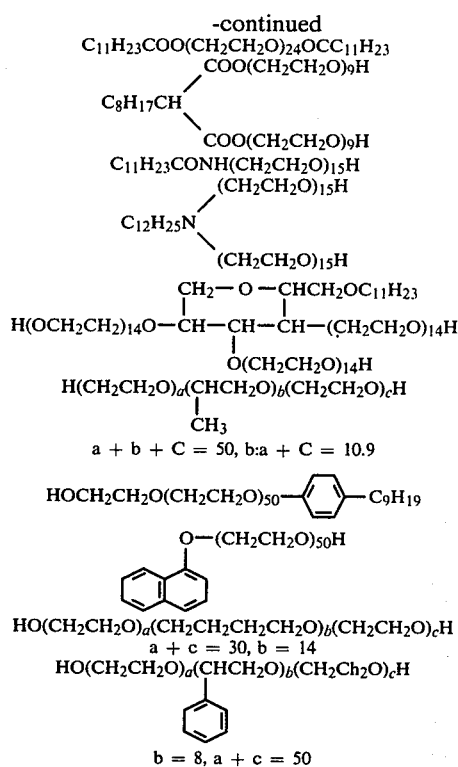

-continued

12. $C_{11}H_{23}COO(CH_2CH_2O)_{24}OCC_{11}H_{23}$

13. $C_8H_{17}CH\begin{matrix}COO(CH_2CH_2O)_9H\\ COO(CH_2CH_2O)_9H\end{matrix}$

14. $C_{11}H_{23}CONH(CH_2CH_2O)_{15}H$

15. $C_{12}H_{25}N\begin{matrix}(CH_2CH_2O)_{15}H\\ (CH_2CH_2O)_{15}H\end{matrix}$ 16. 
$$H(OCH_2CH_2)_{14}O-CH-CH-CH-(CH_2CH_2O)_{14}H$$
with side chains $CH_2-O-CHCH_2OC_{11}H_{23}$ and $O(CH_2CH_2O)_{14}H$ 17. $H(CH_2CH_2O)_a(CHCH_2O)_b(CH_2CH_2O)_cH$, side chain $CH_3$
$a + b + c = 50$, $b:a + C = 10.9$

18. $HOCH_2CH_2O(CH_2CH_2O)_{50}$—⟨C_6H_4⟩—$C_9H_{19}$ 19. naphthyl—$O-(CH_2CH_2O)_{50}H$ 20. $HO(CH_2CH_2O)_a(CH_2CH_2CH_2CH_2O)_b(CH_2CH_2O)_cH$
$a + c = 30$, $b = 14$ 21. $HO(CH_2CH_2O)_a(CHCH_2O)_b(CH_2Ch_2O)_cH$ with phenyl side chain
$b = 8$, $a + c = 50$ These polyalkylene oxide compounds may be used alone or as a mixture of two or more.

The polyalkylene oxide compounds are added to the silver halide emulsions by a conventional method. Namely, they are added to the emulsions before application thereof, preferably after chemical aging, as an aqueous solution or a solution in a water compatible organic solvent preferably having a low boiling point. A part of them may be added to non-sensitive hydrophilic colloid layers, for example, a protective layer, etc., instead of to the emulsions. A suitable amount of the polyalkylene oxide compounds is about 0.01 to 10 g per mol of the silver halide in the emulsion layer or the hydrophilic colloid layer adjacent the emulsion layer when the polyalkylene oxide is also present in a hydrophilic colloid layer.

The silver halide emulsions used in the present invention can be produced by a neutral process, an acid process, a single jet process, a double jet process or a controlled double jet process, etc., described in The Theory of the Photographic Process, 3rd Edition, pp. 31–43, written by Mees, published by Macmillan Co. (1967) and Chimie Photographique, 2nd Edition, pp. 251–308, written by P. Glafikides, published by Paul Montel Co. (1957).

As silver halide compositions, silver chloride, silver bromide, silver iodide, silver chlorobromide and silver chlorobromoiodide, etc., are used. Particularly, silver chlorobromide and silver chloroiodobromide containing at least about 60% by mol (preferably 75% by mol) of silver chloride and about 0 to 5% by mol of silver iodide are preferred. Silver halide particles are not resticted in crystal form, crystal habit, particle size and distribution of particle size, but those having 0.7μ or less of the particle size are preferred.

The silver halide emulsions may be chemically sensitized by gold compounds such as chloroaurate or gold trichloride, etc., salts of noble metals such as rhodium or iridium, etc., sulfur compounds which form silver sulfide by reacting with silver salts or reducing materials such as stannous salts or amines.

As carriers for the silver halides, it is possible to use gelatin, modified gelatin, gelatin derivatives and synthetic hydrophilic polymers to form the emulsion layer.

For the purpose of increasing dimensional stability of photographic materials and improving film properties, it is possible to incorporate a polymer latex composed of homo- or copolymers of alkyl acrylate, alkyl methacrylate, acrylic acid or glycidyl acrylate, etc., described in U.S. Pat. Nos. 3,411,911, 3,411,912, 3,142,568, 3,325,286, 3,525,620 and 3,547,650, in silver halide emulsion layers or other layers.

In the photographic emulsions, it is possible to use, as stabilizers or antifogging agents, many heterocyclic compounds including 4-hydroxy-6-methyl-1,3,3a,7-tetrazaindene, 3-methylbenzothiazole and 1-phenyl-5-mercaptotetrazole, mercury containing compounds, mercapto compounds and well known antifogging agents as described in Japanese Patent Application (OPI) Nos. 6306/75 and 19429/75 and U.S. Pat. Nos. 3,850,639 and 3,898,009.

The photosensitive emulsions of the present invention may contain inorganic or organic hardening agents. For example, there are chromium salts (chromium alum or chromium acetate, etc.), aldehydes (formaldehyde, glyoxal or glutaraldehyde, etc.), N-methylol compounds (dimethylol urea or methylol dimethylhydantoin, etc.), dioxane derivatives (2,3-dihydroxydioxane, etc.), active vinyl compounds (1,3,5-triacryloyl-hexahydro-s-triazine or bis(vinylsulfonyl)methyl ether, etc.), active halogen compounds (2,4-dichloro-6-hydroxy-s-triazine, etc.), mucohalogenic acids (mucochloric acid or mucophenoxychloric acid, etc.), isoxazoles, dialdehyde starch and 2-chloro-6-hydroxytriazinyl gelatin, etc., which may be used alone or as a combination thereof. Examples of them have been described in U.S. Pat. Nos. 1,870,354, 2,080,019, 2,726,162, 2,870,013, 2,983,611, 2,992,109, 3,047,394, 3,057,723, 3,103,437, 3,321,313, 3,325,287, 3,362,827, 3,539,644 and 3,543,292, British Pat. Nos. 676,628, 825,544 and 1,270,578, German Pat. Nos. 872,153 and 1,090,427, Japanese Patent Publication Nos. 7133/59 and 1872/71 and Japanese Patent Application (OPI) Nos. 57257/78 and 41221/78.

To the photographic emulsions of the present invention, it is possible to add surface active agents as coating assistants or for the purpose of improving photographic properties. As the surface active agents, there are natural surface active agents such as saponin, nonionic surface active agents such as alkylene oxide type agents (for example, surface active agents described in U.S. Pat. Nos. 3,915,713 and 4,011,082) or glycidol type agents, etc., anionic surface active agents containing acid groups such as a carboxylic acid group, a sulfonic acid group (for example, surface active agents described in U.S. Pat. No. 3,415,649), a phosphoric acid group, a sulfuric acid ester group or a phosphoric acid ester group, etc., and ampholytic surface active agents such as aminoacids, aminosulfonic acids or sulfuric acid or phosphoric acid esters of aminoalcohols, etc. As development accelerating agents, compounds described in, for example, U.S. Pat. Nos. 3,288,612, 3,333,959, 3,345,175, 3,708,303 and 4,070,189, British Pat. No. 1,098,748, German Pat. Nos. 1,141,531 and 1,183,784 and Japanese Patent Application (OPI) Nos. 99031/74, 65436/77 and 114328/77 can be used. In addition, description of *Product Licensing Index,* Vol. 92 (1971), pp. 107–110 can be referred to concerning additives for emulsions and methods for producing sensitive materials.

Exposure for obtaining photographic images in the present invention can be carried out by any conventional method with using various known light sources such as a tungsten lamp, a fluorescent lamp, a mercury lamp, a xenon arc lamp, a carbon arc lamp, a xenon flash lamp, a halogen lamp, an illuminant diode, a cathode-ray tube flying spot or a discharge tube such as a glow tube, etc. Concerning exposure time, it is possible to adopt exposure for less than 1/1,000 second, for example, exposure for $1/10^4$ to $1/10^6$ second using a xenon flash lamp, a cathode ray tube or laser light (Ne-He laser or argon laser, etc.) and exposure for more than 1 second, not to mention exposure for 1/1,000 to 1 second. If necessary, spectral composition of the light used for exposure can be controlled using a color filter.

The photographic processing of layers composed of the photographic emulsions of the present invention can be carried out by any known method. As processing solutions, known ones can be used. The processing temperature is selected from the range from 18° C. to 50° C., but temperatures of lower than 18° C. or higher than 50° C. may be used, too. Any development processing for forming silver images (black-and-white photographic processing) and color photographic processing comprising development for forming color images may be used according to the purpose.

Developing solutions used for carrying out the black-and-white photographic processing may contain known developing agents. As the developing agents, there are dihydroxybenzenes (for example, hydroquinone), 3-pyrazolidones (for example, 1-phenyl-3-pyrazolidone), aminophenols (for example, N-methyl-p-aminophenol), 1-phenyl-3-pyrazolines and ascorbic acid, etc., which may be used alone or as a combination thereof. The developing solution generally contains known preservatives, alkali agents, pH buffer agents and antifogging agents in addition to the developing agent. Further, it may contain, if necessary, dissolution assistants, color toning agents, development accelerators, surface active agents, defoaming agents, hard water softeners, hardening agents or viscosity increasing agents, etc.

The photographic emulsions of the present invention can be processed by the so-called "lithographic" development processing. The "lithographic" development processing means development processing in which development is carried out infectiously using dihydroxybenzenes as a developing agent in a low sulfurous acid ion concentration in order to carry out photographic reproduction of line images or photographic reproduction of halftone images (refer to *Photographic Processing Chemistry,* pp. 163–165, written by Mason (1966)).

The lithographic developing solution suitably used in the present invention (infectious developing solution) is composed essentially of o- or p-dihydroxybenzenes, alkali agents, a small amount of free sulfite and a sulfurous acid ion buffer, etc. The o- or p-dihydroxybenzene as the developing agent can be suitably selected from compounds known in the photographic field. Examples of the o- or p-dihydroxybenzene include hydroquinone, chlorohydroquinone, bromohydroquinone, isopropylhydroquinone, toluhydroquinone, methylhydroquinone, 2,3-dichlorohydroquinone and 2,5-dimethylhydroquinone, etc. Among them, hydroquinone is particularly practical.

These developing agents may be used alone or as a mixture of two or more thereof. A suitable amount of the developing agents is about 1 to 100 g, preferably about 5 to 80 g, per liter of the developing solution. The sulfurous acid ion buffer is used in an amount effective to keep the sulfite concentration in the developing solution at a nearly definite value, examples of which include aldehyde-alkali hydrogen sulfite adducts such as formaldehyde sodium hydrogen sulfite adduct, etc., ketone-alkali hydrogen sulfite adducts such as acetone-sodium hydrogen sulfite adduct, etc., and carbonyl bisulfurous acid-amine condensation products such as sodium bis(2-hydroxyethyl)aminomethanesulfonate, etc. The amount of the sulfurous acid ion buffer is about 13 to 130 g per liter of the developing solution.

In the developing solutions used in the present invention, it is possible to control the free sulfurous acid ion concentration by adding alkali sulfites such as sodium sulfite thereto. The amount of the sulfites is generally about 5 g or less and preferably about 3 g or less, but more than 5 g may be added, of course.

In many cases, it is preferred to incorporate alkali halides (particularly, bromides such as sodium bromide or potassium bromide) as a development controller. The alkali halides are preferably added in an amount of about 0.01 to 10 g, preferably about 0.1 to 5 g, per liter of the developing solution.

In order to make the pH of the developing solution 9 or more (particularly, pH 9.7 to 11.5), an alkali agent is added. In conventional developing solutions, sodium carbonate or potassium carbonate is added as the alkali agent, the amount of which may be varied.

The developing solutions used for developing the emulsions of the present invention may contain, if necessary, a pH buffering agent such as water-soluble acids (for example, acetic acid, boric acid), alkalis (for example, sodium hydroxide) or salts (for example, sodium carbonate) in addition to the above described components. A certain kind of alkali not only makes the developing solution alkaline but also functions as a pH buffering agent and a development controlling agent. As the preservatives, diethanolamine, ascorbic acid and kojic acid, etc., can be used. A lithographic developing solution containing about 10 to 40 g/l of diethanolamine is preferred because it exhibits stabilized sensitivity and good halftone quality. Further, other components which may be added to the developing solution comprise antifogging agents such as benzotriazole or 1-phenyl-5-mercaptotetrazole and organic solvents such as triethylene glycol, dimethylformamide or methanol.

It is sufficient for each component of the developing solution to be contained when it is used and the composition of the developing solution can be divided into two or more parts. For example, if one part contains the developing agent and another part contains the alkali, they can be directly used by mixing and diluting both of them.

Of course, it is possible to use either a powder type developing solution or a liquid type developing solution.

The development time which depends on the development temperature is usually about 10 to 250 seconds and preferably about 10 to 150 seconds.

The development may be carried out by manually or may be carried out using an automatic development apparatus. But preferred photographic efficiency can be shown, if the automatic development apparatus is used. In case of processing using an automatic development apparatus, the conveying method is not particularly restricted (for example, roll conveying or belt conveying), and conveyor type automatic development apparatus can be used. In addition, the composition of the processing solutions and the method of development are referred to in U.S. Pat. Nos. 3,025,779, 3,079,024, 3,122,086, 3,149,551, 3,156,173, 3,224,356 and 3,573,914.

In case of using the silver halide emulsions of the present invention for color photosensitive materials, color couplers and dispersing agents are contained therein. The finished emulsions are applied to suitable bases such as baryta paper, resin coated paper, artificial paper, triacetate films, polyethylene terephthalate films, glass plates and other plastic bases.

The sensitizing dyes used in the present invention are added to the emulsion as an aqueous solution or as a solution in a water-miscible organic solvent such as methanol, ethanol, methyl cellosolve or pyridine, etc., as described in U.S. Pat. Nos. 3,887,381, 3,955,996, 3,822,135, etc.

The merocyanine dyes in the present invention are used in an amount conventionally used for spectral sensitization, for example, about $5 \times 10^{-3}$ to $1 \times 10^{-6}$, preferably $1 \times 10^{-4}$ to $1 \times 10^{-3}$ mols of the sensitizing dye per mol of silver. In the following, examples of the present invention are described in more detail. However, the present invention is not limited to these examples. The following compounds are used as comparison dyes below.

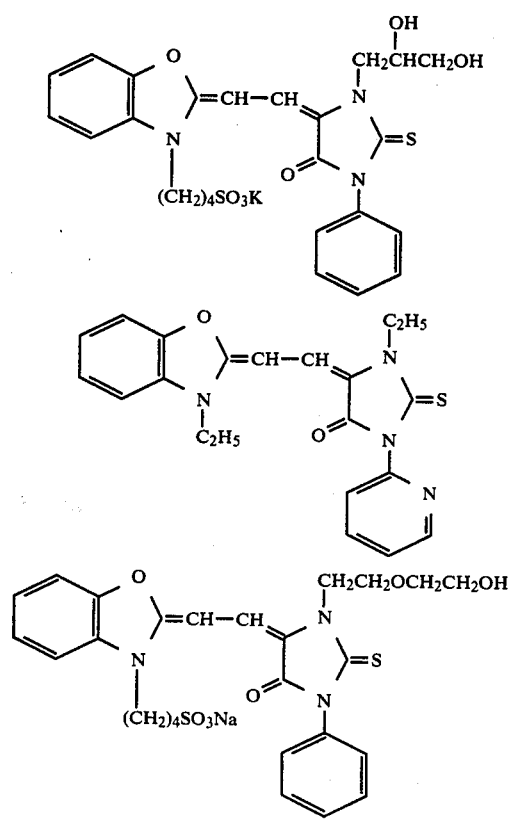

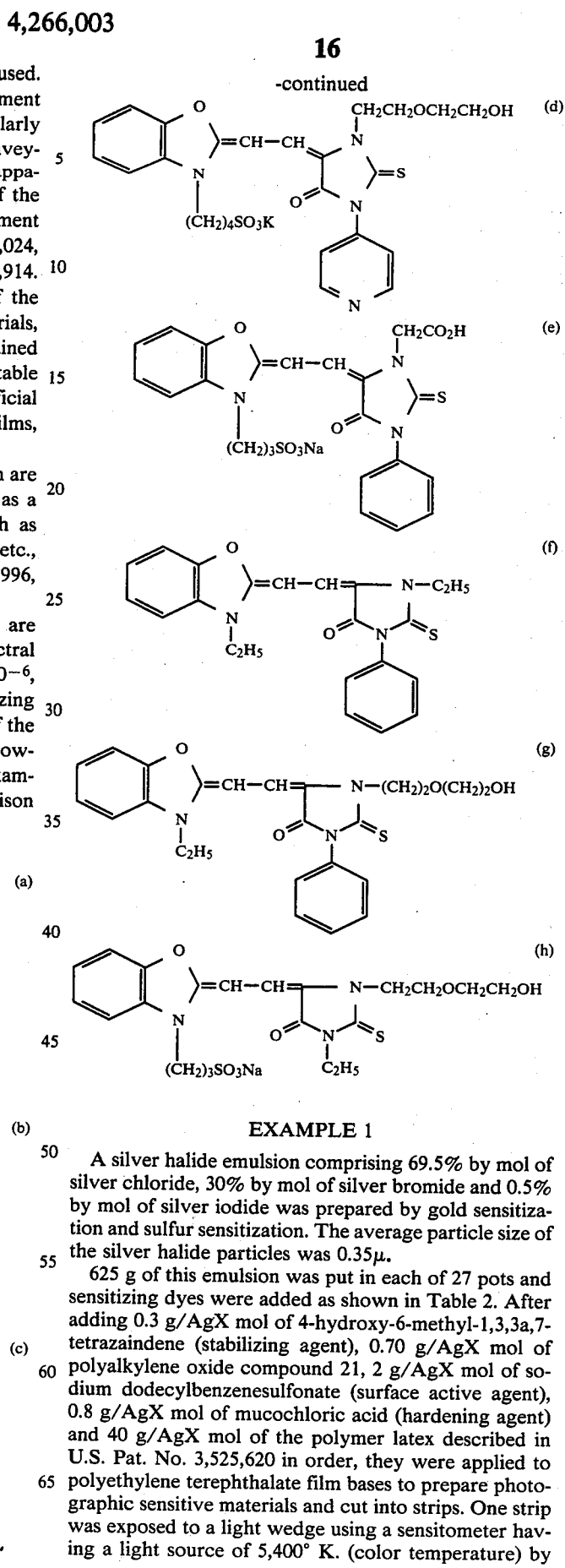

EXAMPLE 1

A silver halide emulsion comprising 69.5% by mol of silver chloride, 30% by mol of silver bromide and 0.5% by mol of silver iodide was prepared by gold sensitization and sulfur sensitization. The average particle size of the silver halide particles was 0.35μ.

625 g of this emulsion was put in each of 27 pots and sensitizing dyes were added as shown in Table 2. After adding 0.3 g/AgX mol of 4-hydroxy-6-methyl-1,3,3a,7-tetrazaindene (stabilizing agent), 0.70 g/AgX mol of polyalkylene oxide compound 21, 2 g/AgX mol of sodium dodecylbenzenesulfonate (surface active agent), 0.8 g/AgX mol of mucochloric acid (hardening agent) and 40 g/AgX mol of the polymer latex described in U.S. Pat. No. 3,525,620 in order, they were applied to polyethylene terephthalate film bases to prepare photographic sensitive materials and cut into strips. One strip was exposed to a light wedge using a sensitometer having a light source of 5,400° K. (color temperature) by putting a green filter (Wratten-58) on the light source. Further, another strip was exposed to a light wedge using a blue filter (Wratten 47B) instead of the green filter. On the other hand, an exposure to determine the spectral sensitization maximum was carried out using a diffraction grating type spectrograph having a 2,666° K. tungsten light source.

Further, a gray contact screen for positives (produced by Dainippon Screen Co., 150 L/inch) was brought into close contact with a sample, and the sample was exposed to light using a white tungsten light (5,400° K.) for 1 second through a stepwedge having 0.1 (Log E) step difference.

After exposing to light, the samples were developed at 27° C. for 100 seconds using the lithographic developing solution shown in Table 1 by means of an automatic developing apparatus.

TABLE 1

| Developing Solution | |
|---|---|
| Hydroquinone | 15 g |
| Adduct of Formaldehyde and Sodium Bisulfite | 50 g |
| Potassium Carbonate | 30 g |
| Sodium Sulfite | 2.5 g |
| Potassium Bromide | 2.0 g |

TABLE 1-continued

| Developing Solution | |
|---|---|
| Boric Acid | 5.0 g |
| Sodium Hydroxide | 3.0 g |
| Triethylene Glycol | 40 g |
| EDTA . 2Na | 1.0 g |
| Water to make | 1,000 ml |

After processing, 10% (9/10 clear, and 1/10 developed density), 50% and 90% dots of the above described samples were observed with a microscope of 100 magnification. The dot quality was evaluated on a 4-grade scale in which A was the best and D was the worst.

Further, the blue sensitivity was measured as a relative sensitivity taking the sensitivity of sample No. 1 as 100 and the green sensitivity was measured as a relative sensitivity taking the sensitivity of Sample No. 2 as 100. The results are shown in Table 2.

TABLE 2

| Test No. | Sensitizing Dye and Amount ($\times 10^{-5}$ mol/kg emulsion) | | Green Sensitivity | Blue Sensitivity | Dot Quality | Sensitization Maximum (nm) | Remarks |
|---|---|---|---|---|---|---|---|
| 1 | — | — | — | 100 | D | — | Control |
| 2 | (3) | 20 | 100 | 125 | B | 538 | Present Invention |
| 3 | " | 40 | 110 | 130 | A | 540 | Present Invention |
| 4 | " | 80 | 99 | 130 | A | 540 | Present Invention |
| 5 | (4) | 20 | 120 | 153 | B | 542 | Present Invention |
| 6 | " | 40 | 133 | 170 | A | 542 | Present Invention |
| 7 | " | 80 | 101 | 169 | A | 542 | Present Invention |
| 8 | (5) | 20 | 115 | 145 | A | 540 | Present Invention |
| 9 | " | 40 | 130 | 170 | A | 540 | Present Invention |
| 10 | " | 80 | 105 | 162 | A | 540 | Present Invention |
| 11 | (7) | 20 | 89 | 138 | B | 538 | Present Invention |
| 12 | " | 40 | 110 | 140 | A | 540 | Present Invention |
| 13 | " | 80 | 105 | 142 | A | 540 | Present Invention |
| 14 | (10) | 20 | 135 | 140 | A | 545 | Present Invention |
| 15 | " | 40 | 142 | 180 | A | 545 | Present Invention |
| 16 | " | 80 | 120 | 150 | A | 545 | Present Invention |
| 17 | (17) | 20 | 110 | 130 | A | 540 | Present Invention |
| 18 | " | 40 | 120 | 150 | A | 540 | Present Invention |
| 19 | " | 80 | 102 | 140 | A | 540 | Present Invention |
| 20 | (c) | 20 | 75 | 125 | C | 540 | Comparison |
| 21 | " | 40 | 70 | 110 | C | 540 | Comparison |
| 22 | " | 80 | 68 | 105 | C | 540 | Comparison |
| 23 | (d) | 20 | 30 | 50 | C | 540 | Comparison |
| 24 | " | 40 | 27 | 48 | C | 540 | Comparison |
| 25 | " | 80 | 10 | 40 | C | 540 | Comparison |
| 26 | (e) | 40 | 32 | 50 | C | 535 | Comparison |
| 27 | " | 80 | 29 | 46 | C | 535 | Comparison |

It is apparent from Table 2, in Samples No. 2 to No. 19 using sensitizing dyes according to the present invention, green sensitivity is high and the quality of the halftone is excellent. However, in Samples No. 20 to No. 27 using other sensitizing dyes and Sample No. 1 containing no sensitizing dye, the green sensitivity is low and the quality of the halftone is inferior to that of the present invention.

EXAMPLE 2

Photographic sensitive materials were obtained by adding the sensitizing dyes shown in Table 3 to emulsions prepared as in Example 1.

The storage stability of the resulting sensitive materials were examined by the following method.

Samples were allowed to stand in a room conditioned at 70% relative humidity (RH) and 50° C. They were exposed to a light wedge using the same green filter or the same blue filter as in Example 1 together with a sample which was stored at a normal temperature (about 20° C.) and a normal humidity (about 50% RH). After exposure to light, they were developed in the same manner as in Example 1.

In Table 3, the relative sensitivity of samples allowed to stand at a high temperature and a high humidity taking the sensitivity of the sample preserved at a normal temperature and a normal humidity as 100 is shown.

TABLE 3

| Test No. | Sensitizing Dyes and Amount ($\times 10^{-5}$ mol/kg) | Green Relative Sensitivity | Blue Relative Sensitivity | Remarks |
|---|---|---|---|---|
| 1 | — | — | 80 | Control |
| 2 | (4) 40 | 87 | 90 | Invention |
| 3 | (5) 40 | 86 | 85 | Invention |
| 4 | (7) 40 | 83 | 87 | Invention |
| 5 | (10) 40 | 87 | 90 | Invention |
| 6 | (14) 20 | 95 | 85 | Invention |
| 7 | (15) 20 | 93 | 86 | Invention |
| 8 | (17) 40 | 87 | 90 | Invention |
| 9 | (e) 40 | 30 | 70 | Comparison |
| 10 | (h) 40 | 60 | 60 | Comparison |

As is apparent from Table 3, Samples No. 2 to No. 8 using sensitizing dyes of the present invention show less desensitization as compared with Sample No. 1 containing no sensitizing dye and Samples No. 9 and No. 10 using sensitizing dyes for comparison.

EXAMPLE 3

Photographic sensitive materials were obtained by adding the sensitizing dyes shown in Table 5 to the same emulsion as in Example 1. In order to examine the degree of stain due to the sensitizing dyes after development, unexposed photographic sensitive materials were subjected to the following processing. Namely, development and fixation were carried out for 60 seconds each using the developing solution of Table 1 (Example 1) and a fixing solution shown in Table 4 using the same automatic development apparatus as in Example 1. After washing with water and drying, stains were observed.

TABLE 4

| Composition of Fixing Solution | | |
|---|---|---|
| Water | 700 | ml |
| Ammonium Thiosulfate | 140 | g |
| Sodium Sulfite | 16 | g |
| Sodium Acetate | 18 | g |
| Ammonium Hydroxide | 2 | g |
| EDTA . 2Na . 2H$_2$O | 0.1 | g |
| Aluminum Sulfate | 11 | g |
| Sulfuric Acid | 4 | g |

TABLE 4-continued

| Composition of Fixing Solution | | |
|---|---|---|
| Water to make | | 1 l |

TABLE 5

| Test No. | Sensitizing Dye and Amount ($\times 10^{-5}$ mol/kg) | Stain Grade* | Remarks |
|---|---|---|---|
| 1 | — — | A | Control |
| 2 | (3) 40 | B | Invention |
| 3 | (4) 40 | A | Invention |
| 4 | (7) 40 | B | Invention |
| 5 | (10) 40 | A | Invention |
| 6 | (11) 40 | B | Invention |
| 7 | (16) 40 | A | Invention |
| 8 | (17) 40 | A | Invention |
| 9 | (18) 40 | B | Invention |
| 10 | (b) 20 | D | Comparison |
| 11 | " 40 | E | Comparison |
| 12 | (f) 20 | D | Comparison |
| 13 | " 40 | E | Comparison |
| 14 | (g) 40 | E | Comparison |

*A: Very clean. Only the base density is observed.
B: Very slight stain.
C: Weak coloration.
D: Coloration.
E: Strong coloration.

As is apparent from Table 3, the dyes of the present invention cause very slight stain. This effect is obtained from a combination of substituents in the dyes, namely, the combination of the substituents $R_1$ and $R_2$ and the substituent on the 3-position of the thiohydantoin nucleus of the formula (I). For example, substituents in dyes (a), (b), (f) or (g) for comparison are partially the same as those in the dyes of the present invention, but the combinations are different from those in the present invention. When the above described substituents have combinations represented by the formula in the present invention, less stain is obtained.

EXAMPLE 4

A silver halide emulsion comprising 75% by mol of silver chloride and 25% by mol of silver bromide was prepared by gold sensitization and sulfur sensitization. The average particle size of the silver halide particles was 0.33$\mu$. After adding sensitizing dyes and other additives in the same manner as in Example 1, the emulsion was applied to film bases to obtain photographic materials. The resulting film sample was cut in strips, one of which was exposed to a light wedge by means of a sensitometer having a light source of 5,400° K. color temperature using the above described green filter and the other was similarly exposed to a light wedge using the above described blue filter instead of the green filter. After exposure to light, they were developed using the developing solution shown in Table 6 at 20° C. for 2 minutes. Sensitivities of each sample based on the blue sensitivity of Sample No. 1 as 100 and the green sensitivity of Sample No. 8 as 100 are shown in Table 7.

TABLE 6

| Composition of Developing Solution* | | |
|---|---|---|
| Water | 700 | ml |
| Metol | 3.1 | g |
| Anhydrous Sodium Sulfite | 45.0 | g |
| Hydroquinone | 12.0 | g |
| Sodium Carbonate (monohydrate) | 7.9 | g |
| Potassium Bromide | 1.9 | g |

TABLE 6-continued

| Composition of Developing Solution* | | |
|---|---|---|
| Water to make | 1 | 1 |

*2 parts by volume of water are added to 1 part by volume of the above described developing solution for use.

Samples No. 2 to No. 4 and No. 8 to No. 10 using the sensitizing dyes according to the present invention have high green sensitivity as compared with Samples No. 5 to No. 7 and No. 11 to No. 13 using the sensitizing dyes for comparison.

TABLE 7

| Test No. | Sensitizing Dye and Amount ($\times 10^{-5}$ mol/kg) | Green Sensitivity | Blue Sensitivity | Fog | Remarks |
|---|---|---|---|---|---|
| 1 | — | — | 100 | 0.03 | Control |
| 2 | (4) 20 | 115 | 148 | 0.03 | Invention |
| 3 | " 40 | 123 | 159 | 0.03 | Invention |
| 4 | " 80 | 98 | 159 | 0.03 | Invention |
| 5 | (c) 20 | 89 | 126 | 0.03 | Comparison |
| 6 | " 40 | 89 | 126 | 0.03 | Comparison |
| 7 | " 80 | 69 | 117 | 0.03 | Comparison |
| 8 | (17) 20 | 100 | 130 | 0.03 | Invention |
| 9 | " 40 | 112 | 135 | 0.03 | Invention |
| 10 | " 80 | 89 | 126 | 0.03 | Invention |
| 11 | (a) 20 | 83 | 117 | 0.03 | Comparison |
| 12 | " 40 | 89 | 120 | 0.03 | Comparison |
| 13 | " 80 | 66 | 110 | 0.03 | Comparison |

EXAMPLE 5

The samples used in Example 2 were allowed to stand in the same manner as in Example 2. They were exposed to a light wedge with using a green filter or a blue filter in the same manner as in Example 1 and developed at 20° C. for 2 minutes using the developing solution shown in Table 6 (Example 4). In Table 8, relative sensitivity of the samples allowed to stand at a high temperature and a high humidity based on the sensitivity of the sample stored at a normal temperature and a normal humidity being 100 is shown.

TABLE 8

| Test No. | Sensitizing Dye and Amount ($\times 10^{-5}$ mol/kg) | Green Relative Sensitivity | Blue Relative Sensitivity | Remarks |
|---|---|---|---|---|
| 1 | — | — | 80 | Control |
| 2 | (4) 40 | 83 | 80 | Invention |
| 3 | (5) 40 | 87 | 80 | Invention |
| 4 | (7) 40 | 81 | 80 | Invention |
| 5 | (10) 40 | 80 | 80 | Invention |
| 6 | (14) 20 | 93 | 83 | Invention |
| 7 | (15) 20 | 91 | 83 | Invention |
| 8 | (17) 40 | 83 | 80 | Invention |
| 9 | (e) 40 | 28 | 74 | Comparison |
| 10 | (h) 40 | 62 | 65 | Comparison |

As is apparent from Table 8, sensitizing dyes of the present invention cause less deterioration of photographic properties under severe conditions. Namely, in Sample No. 1 containing no sensitizing dye, the sensitivity reduces to 80% upon storage under high temperature and high humidity. In Samples No. 2 to No. 8 using the sensitizing dyes of the present invention, the deterioration of sensitivity under the same conditions as described above is the same as or less than that of Sample No. 1. On the other hand, deterioration of sensitivity of sensitizing dyes (e) and (h) is high.

While the invention has been described in detail and with reference to specific embodiments thereof, it will be apparent to one skilled in the art that various changes and modifications can be made therein without departing from the spirit and scope thereof.

What is claimed is:

1. A silver halide photographic emulsion which compares at least one compound represented by the formula (II):

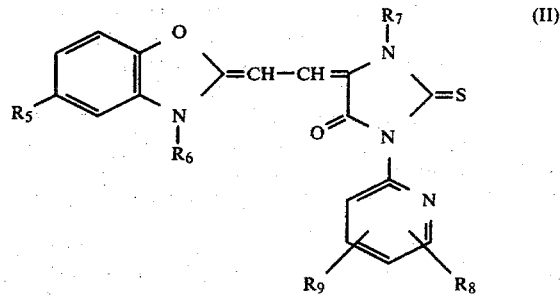

wherein $R_5$ represents a hydrogen atom, a chlorine atom, a hydroxyl group, an alkylcarbonyloxy group having up to 3 carbon atoms, an unsubstituted alkyl group having up to 4 carbon atoms, or an unsubstituted alkoxy group having up to 4 carbon atoms; $R_6$ represents a sulfoalkyl group having 2 to 4 carbon atoms: $R_7$ represents a hydroxyalkoxyalkyl group having 2 to 6 carbon atoms, or a hydroxyalkyl group having 2 to 4 carbon atoms; $R_8$ represents a hydrogen atom, a chlorine atom, a methyl group, an ethyl group, a methoxy group, or an ethoxy group; and $R_9$ represents a hydrogen atom, a methyl group, or a methoxy group.

2. The silver halide emulsion layer of claim 1, wherein said emulsion additionally contains a polyalkylene oxide compound.

3. The silver halide emulsion layer of claim 2, wherein said polyalkylene oxide compound is present in an amount of about 0.01 to 10 g per mol of silver halide.

4. The silver halide emulsion of claim 1, wherein said silver halide is a silver chlorobromide or a silver chloroiodobromide containing at least about 60 mol% silver chloride and about 0 to 5 mol% silver iodide.

5. The silver halide emulsion of claim 1, wherein said emulsion is chemically sensitized.

6. A lithographic silver halide photographic material comprising a support having thereon a silver halide emulsion layer containing at least one compound represented by the formula (II):

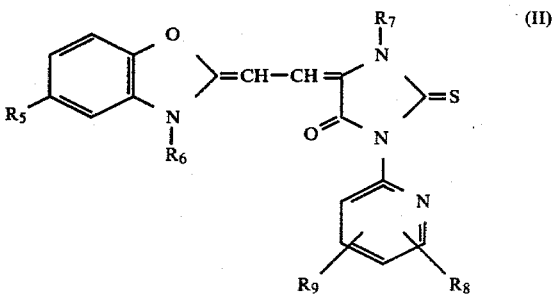

wherein $R_5$ represents a hydrogen atom, a chlorine atom, a hydroxyl group, an alkylcarbonyloxy group having up to 3 carbon atoms, an unsubstituted alkyl group having up to 4 carbon atoms, or an unsubstituted alkoxy group having up to 4 carbon atoms; $R_6$ represents a sulfoalkyl group having 2 to 4 carbon atoms; $R_7$ represents a hydroxyalkoxyalkyl group having 2 to 6 carbon atoms, or a hydroxyalkyl group having 2 to 4 carbon atoms; $R_8$ represents a hydrogen atom, a chlorine atom, a methyl group, an ethyl group, a methoxy group, or an ethoxy group; and $R_9$ represents a hydrogen atom, a methyl group, or a methoxy group; and said emulsion layer and optionally an adjacent hydrophilic colloid layer contains a polyalkylene oxide compound.

7. The lithographic material of claim 6, wherein said polyalkylene oxide compound is present in an amount of 0.01 to 10 g per mol of silver halide.

8. The lithographic material of claim 6, wherein said polyalkylene oxide compound is a condensate of a polyalkylene oxide containing at least 10 alkylene oxide units and a compound having at least one active hydrogen atom.

9. The lithographic material of claim 8, wherein said compound having at least one active hydrogen is water, an aliphatic alcohol, an aromatic alcohol, an aliphatic acid, an organic amine or hexitol.

10. The lithographic material of claim 6, wherein said polyalkylene oxide is selected from the group consisting of polyalkylene glycol, polyalkylene glycol alkyl ethers, polyalkylene glycol aryl ethers, polyalkylene glycol alkylaryl ethers, polyalkylene glycol esters, polyalkylene glycol aliphatic acid amides, polyalkylene glycol amines, polyalkylene glycol block copolymers and polyalkylene glycol graft copolymers.

11. The lithographic material of claim 6, wherein said polyalkylene oxide compound contains 14 to 100 alkylene oxide units.

12. The lithographic material of claim 6, wherein said polyalkylene oxide compound has a molecular weight of about 300 to 1,500.

13. The lithographic material of claim 6, wherein said silver halide is silver chlorobromide or silver chloroiodobromide containing at least about 60 mol% silver chloride and about 0 to 5 mol% silver iodide.

14. A method for forming images which comprises exposing the lithographic material of claim 6 and infectiously developing said material.

15. The process of claim 14, wherein said infectious developing solution contains an o- or p-dihydroxybenzene, an alkali, free sulfite and a sulfurous acid ion buffer.

16. The process of claim 14, wherein said developing solution additionally contains diethanolamine.

17. The silver halide emulsion of claim 1, wherein $R_5$ represents a hydrogen atom or a chloride atom.

18. The lithographic material of claim 6, wherein $R_5$ represents a hydrogen atom or a chlorine atom.

19. The silver halide emulsion of claim 1, wherein $R_5$ is hydrogen.

20. The lithographic material of claim 6, wherein $R_5$ is hydrogen.

21. The silver halide emulsion of claim 1, wherein $R_8$ and $R_9$ are selected from the group consisting of hydrogen and methyl.

22. The lithographic material of claim 6, wherein $R_8$ and $R_9$ are selected from the group consisting of hydrogen and methyl.

* * * * *